| United States Patent [19] | | [11] | 4,224,196 |
|---|---|---|---|
| Gursky | | [45] | Sep. 23, 1980 |

[54] FLEX RESISTANT SIDEWALL COMPOUNDS

[75] Inventor: Leonard Gursky, East Brunswick, N.J.

[73] Assignee: Exxon Research & Engineering Co., Florham Park, N.J.

[21] Appl. No.: 967,369

[22] Filed: Dec. 7, 1978

[51] Int. Cl.$^2$ ............................ C08L 7/00; C08L 15/02
[52] U.S. Cl. .................................. 260/3.5; 152/353 R; 152/DIG. 12; 260/5; 260/33.6 AQ; 525/210; 525/215
[58] Field of Search ............ 260/3.5, 5, 889, 33.6 AQ; 525/210, 215

[56] References Cited

U.S. PATENT DOCUMENTS

| 3,541,032 | 11/1970 | Pampus et al. | 260/5 |
| 3,630,974 | 12/1971 | Ladocsi et al. | 260/5 |
| 3,830,274 | 8/1974 | Waser, Jr. | 260/5 |

*Primary Examiner*—Theodore E. Pertilla
*Attorney, Agent, or Firm*—A. H. Krumholz; H. L. Cohen

[57] ABSTRACT

Pneumatic tire sidewall compositions are disclosed comprising blends of a halobutyl rubber, a high unsaturation rubber and an oil extended terpolymer of ethylene, propylene, and a diene wherein the oil extended terpolymer contains from between 25 to 150 phr of a paraffinic or naphthenic oil. These triblends provide sidewalls of unexpectedly improved flex resistance, even as compared to similar triblend compositions in which similar amounts of oil are included, but in which an oil extended terpolymer is not employed. Furthermore, methods of preparing such compositions are also disclosed comprising preparing an oil extended terpolymer, and then blending that terpolymer with the halobutyl and high unsaturation rubbers.

12 Claims, No Drawings

FLEX RESISTANT SIDEWALL COMPOUNDS

FIELD OF THE INVENTION

The present invention relates to pneumatic tire sidewall compositions. More particularly, the present invention relates to improved pneumatic tire sidewall compositions comprising blends of halobutyl rubber, high unsaturation rubber, and terpolymers of ethylene, propylene and a diene, and to improved compositions thereof having superior flex resistance.

BACKGROUND OF THE INVENTION

Pneumatic rubber tires include sidewalls, and in many cases are made with decorative sidewalls colored in contrast to the tread, such as white sidewalls colored with a titanium dioxide pigment. Sidewalls are continuously subjected to distortion under their normal operating conditions, and the sidewalls are subject to extensive flexing and can crack. In addition to such flex-cracking, such sidewalls are also subject to atmospheric chemical action such as by ozone attack, and the overall effect is that the sidewalls erode and degrade and can even separate from the tire carcass during use.

One prior composition which has been developed for overcoming these problems is disclosed in U.S. Pat. No. 3,508,595 to Wilson, and assigned to the General Tire & Rubber Company. This patent discloses a blend of chlorobutyl rubber, natural rubber, and ethylene propylene terpolymer as the protective cover for the white sidewalls used in such pneumatic tire construction. In column 4 of this patent it is also disclosed that other ingredients can be included in this triblend composition, and in a typical composition it is disclosed that 12 parts of naphthenic oil is included in an overall blend of 224.24 parts. The oil in this case, however, is a separate component added to the triblend composition which already includes the ethylene, propylene terpolymer.

U.S. Pat. No. 3,630,974 to Ladocsi et al, assigned to Esso Research and Engineering Company, further discloses the use of terpolymers for blending into high unsaturation rubbers in order to enhance their static ozone resistance. This patent also discloses a triblend of halobutyl rubber along with a terpolymer and a high unsaturation rubber in order to improve dynamic ozone resistance and heat flex resistance. The terpolymers employed by this patentee comprise ethylene, propylene and a diene, and the high unsaturation rubber can include natural rubber, styrene butadiene rubber, etc. It is again noted that various fillers can be used in connection with these compositions, and among the variety of materials listed are various "oils" along with resins, waxes, etc. The patentee specifically discloses the use of 10 parts oil per 100 parts of rubber in these final blends. This patent also discloses that the terpolymer used will not include more than 10 or 20% of the diolefin therein. It is also noted that while U.S. Pat. No. 3,865,763 to Feniak, assigned to Polysar Limited, is primarily concerned with stabilization of halogenated butyl rubber with boron compounds, example 5 of that patent discloses a combination of brominated butyl rubber with both an ethylene propylene rubber and an SBR rubber.

Finally, U.S. Pat. No. 3,830,274 to Waser, Jr., assigned to the Goodyear Tire and Rubber Company, discloses yet another elastomer blend for use in pneumatic tire sidewall compositions, in this case employing an ethylene propylene conjugated diene terpolymer along with bromobutyl rubber and a cis-1,4-polyisoprene rubber such as natural or synthetic natural rubber, along with a rubbery cis-1,4-polybutadiene with a particularly claimed molecular weight distribution. The patentee claims that this blend provides substantially improved hot flex-life and carcass adhesion properties for tire sidewalls.

Oil-extended terpolymers are also now known. These elastomers, such as VISTALON 3777 marketed by Exxon Chemical Co., are terpolymers of ethylene, propylene and a diene extended with about 75 phr of a paraffinic oil. These materials have been found useful in certain mechanical applications, such as hoses, and various extruded parts.

SUMMARY OF THE INVENTION

In accordance with the present invention it has now been discovered that a highly improved pneumatic tire sidewall composition can be prepared by blending together a halobutyl rubber, a high unsaturation rubber, and an oil extended terpolymer of ethylene, propylene, and a diene. Specifically, the oil extended terpolymer used in such blends contains from between about 25 and 150 phr of a naphthenic or paraffinic oil, and preferably between about 70 and 110 phr of a naphthenic or paraffinic oil.

The tire sidewall compositions of the present invention are thus prepared by producing an oil extended terpolymer, the oil extended terpolymer having a Mooney viscosity of between about 30 and 70, preferably 35 and 55, ML (1+8) at 127° C., and then preparing the blend by mixing the oil extended terpolymer with a halobutyl rubber and a high unsaturation rubber component (Mooney test defined in ASTM D-1646).

In a preferred embodiment of the present invention the sidewall composition will comprise from about 20 to 70 parts of halobutyl rubber, preferably chlorobutyl rubber, from about 20 to 70 parts of the high unsaturation rubber, and from 10 to 60 parts of the oil extended terpolymer.

The sidewall compositions of the present invention can be compounded by methods generally known in the rubber compounding art, such as by mixing with the uncured compositions various processing and curing aids, extenders and fillers such as sulphur, curing accelerators or retarders, anti-oxidants, and anti-ozonants, pigments and rubber processing oils.

DETAILED DESCRIPTION

The principal advantages realized in accordance with the present invention primarily stem from the fact that by substituting the present oil extended terpolymer for the terpolymers previously employed in such compositions, it is possible to improve the flexing characteristics of these compositions.

EPDM is the ASTM designation for a terpolymer of ethylene, propylene and a non-conjugated diolefin. In such terpolymers the ethylene and propylene form a fully saturated backbone of methylene linkages with the non-conjugated diolefin, e.g. dicyclopentadiene or substituted norbornene, attached so as to provide unsaturated side chains with readily available crosslinking sites for sulphur curing. The EPDM elastomers thus contain a fully saturated backbone which provides outstanding resistance to oxidation, ozone, and cracking, as well as excellent low temperature flexibility. The EPDM terpolymers of the present invention will comprise ultra high molecular weight polymers, that is, absent oil extension they will have a Mooney viscosity in excess of about 100° at 260° F. In addition, they will have an ethylene content of between about 50 to 75%, and a diene level of from about 3 to 12% based on the weight of the terpolymer prior to oil extension. Oil extension of the terpolymer is carried out at the time of its manufacture by means well known in the art. The oil extended terpolymer contains from between about 25 and 150 phr of a naphthenic or paraffinic oil, and preferably between about 70 and 110 phr of a naphthenic or paraffinic oil. Naphthenic and paraffinic oils are well known in the art and are further defined in ASTM D2226 and shown in "Materials and Compounding Ingredients for Rubber" published by Bell Communications, Inc. (1975) at pages 145–190.

The non-conjugated dienes may be straight chain or cyclic hydrocarbon diolefins having from 6 to 15 carbon atoms, such as dicyclopentadiene, tetrahydroindene, including alkyl substituted tetrahydroindenes, 5-methylene-2-norbornene, 5-vinyl-2-norbornene, 2-methyl-norbornadiene, 2,4-dimethyl-2,7-octadiene, 1,4-hexadiene, 5-ethylidene-2-norbornene, and 3-methyl cyclopentene. The most preferred compounds include 5-methylene-2-norbornene, dicyclopentadiene, 1,4-hexadiene, 5-ethylidene-2-norbornene, and 4,7,8,9-tetrahydroindene.

The term "butyl rubber" as employed herein is intended to refer essentially to a vulcanizable rubbery copolymer containing from about 85 to 99.5% combined isoolefin having from 4 to 8 carbon atoms and 0.5 to 15% combined conjugated diolefin having 4 to 8 carbon atoms. Such copolymers and their preparation are well known. The isoolefin, such as isobutylene, is admixed with a conjugated diolefin having about 4 to 8 carbon atoms, such as butadiene or isoprene. An inert diluent selected from $C_4$ to $C_8$ aliphatic alkenes and chlorinated hydrocarbons such as methyl chloride, ethyl chloride, methylene chloride and ethylene dichloride are admixed therewith. The monomers may form from 10 to 50% by weight of the total monomer/diluent mixture. The mixture is cooled and polymerized in a reactor at a temperature in the range from about 0° C. to about −165° C. using a cationic catalyst such as aluminum chloride, aluminum bromide, aluminum ethyl dichloride, titanium tetrachloride or boron trifluoride. The polymerization reaction proceeds rapidly to produce a copolymer in the form of a slurry in the diluent. The slurry is removed from the reactor and the copolymer separated therefrom and recovered by well-known methods.

The preferred copolymers which are used to produce the halogenated rubbers of this invention are copolymers of isobutylene and isoprene which are normally produced using methyl chloride as diluent and aluminum trichloride catalyst. Preferably the copolymers have an isobutylene content of from about 95 to 99.5 weight percent. The halogenated polymer should preferably contain at least about 0.5 weight percent of combined halogen, but not more than about one atom of chlorine or three atoms of bromine per double bond present in the original copolymer. Preferably, it contains from about 0.5 to about 2 weight percent of chlorine or from about 0.5 to about 5 weight percent bromine. Most preferably, the halogenated polymer is chlorinated butyl rubber containing from about 1.0 to about 1.5 weight percent chlorine.

The halogenated rubber can also contain more than one halogen in its structure, e.g., chlorine and bromine.

One method for preparing such a product is to halogenate a solution of butyl rubber using bromine chloride as the halogenating agent, said solution containing between 1 to 60% by weight of butyl rubber in a substantially inert $C_5$–$C_8$ hydrocarbon solvent such as pentane, hexane, heptane, etc. The bromine chloride may be introduced into the butyl cement as a liquid, or, in a preferred method, by first vaporizing said bromine chloride before contacting said cement and halogenating the butyl rubber in a period of from about 1–30 minutes. Recovery of the bromochlorinated product from solution is substantially similar to the recovery of bromobutyl or chlorobutyl well known in the art. The product prepared by reaction of bromine chloride with butyl rubber is characterized in that the product contains from about 1.0 to about 3.0 weight % bromine and from about 0.05 to about 0.5 weight % of chlorine; the mole ratio of bromine:chlorine is about 4:1. The preparation and composition of such a polymer is disclosed in U.S. Pat. No. 4,130,519 to R. Roper et al, incorporated herein by reference. Other methods of incorporating more than one halogen in butyl rubber are available, e.g., brominating a polymer which has been previously chlorinated or chlorinating a polymer which has been previously brominated, halogenating with a mixture of bromine and chlorine, etc. (see e.g., U.S. Pat. No. 3,009,904 to C. E. Serniuk et al, incorporated herein by reference.

The butyl rubber may be halogenated by means known in the art. The solid rubber may be reacted on a hot rubber mill with a compound which releases halogen such as nitrogen halo-succinimide and nitrogen halo-hydantoin. Alternatively, the butyl rubber may be dissolved in an inert hydrocarbon solvent such as pentane, hexane or cyclohexane and halogenated by addition to the solution of elemental chlorine or bromine. In a typical commercial process, butyl rubber is dissolved in a solvent to form a solution containing from about 5 to about 30 weight percent of rubber. Elemental chlorine or bromine is added to the solution, at a temperature of 0° to about 100° C., in sufficient quantity that the chlorinated or brominated rubber recovered contains up to 1 atom of chlorine or up to 3 atoms of bromine per carbon-carbon double bond originally in the butyl rubber.

The high unsaturation rubbers used in this invention include natural rubber, polybutadiene, SBR (a copolymer of styrene and butadiene), polychloroprene (a homopolymer of 2-chlorobutadiene-1,3) and synthetic polyisoprene, while the most highly preferred unsaturated rubbers for use herein are the hydrocarbon rubbers, the most preferred being natural rubber.

Various fillers can also be used in the blends of the present invention, and these include a variety of carbon blacks, clays, silicas, carbonates, oils, resins, and waxes. The blends are cured with conventional curatives for high unsaturated or chlorobutyl rubbers, including sulphur, alkylphenol disulphide, zinc oxide, sulphenamide derivatives, guanidines, and benzothiazyl-disulphide.

Having thus described the present invention, it can be more fully understood with reference to the following examples thereof.

EXAMPLE 1

In order to demonstrate the unexpectedly improved flexing characteristics of the sidewall compositions of the present invention, such compositions were prepared and compared to a comparable formulation employing a conventional EPDM terpolymer used in combination with a naphthenic oil mixed with the triblend. Thus, compositions were prepared having similar overall viscosities and modulus and equivalent overall percentages of oil being present, but with the compositions of the present invention employing the higher molecular weight EPDM terpolymers which had been oil extended prior to preparation of the overall triblend compositions. Each of the compositions were prepared from a base recipe as follows:

|  | PARTS |
|---|---|
| Chlorobutyl rubber (Exxon Chlorobutyl 1066, marketed by Exxon Chemical Company, having a specific gravity of 0.92, a degree of unsaturation of from 1.1 to 1.7 mol. %, a Mooney viscosity (ML 1+8) of from 51.0 to 60.0 at 212° F. and including 1.1 to 1.3 wt. % chlorine and a non-staining stabilizer) | 35 |
| SBR (SBR 1502, including about 23.5% bound styrene and having a Mooney viscosity (ML 1+4) of about 52 at 212° F.) | 30 |
| Natural Rubber (#1 RSS) | 20 |
| Carbon Black (N 339, having an average particle size of 25 mμ, an average surface area of 91 m²/gm and being in the form of pellets) | 20 |
| Carbon Black (N 774, having an average particle size of 70 mμ, an average surface area of 27 m²/gm, and also being in the form of pellets) | 20 |
| Stearic Acid | 2 |
| Zinc oxide | 3 |
| 2,2'-benzothiazyl disulfide | 0.8 |
| Sulphur | 0.8 |
| Alkyl phenoldisulfide (Vultac 5, marketed by Penwalt Corp., on an inert carrier, and having a specific gravity of 1.435, a sulfur content of from about 18.5 to 21%, and being a free flowing brown powder) | 1.5 |

To this base recipe was added a number of additional components in order to produce compositions A through D as follows:

COMPOSITION A

To the base recipe was added 15 parts of a high diene EPDM (Vistalon 6505, marketed by Exxon Chemical Co. having a Mooney viscosity (ML 1+8) of from about 45 to 55 at 260° F., a specific gravity of 0.86, and being a sulfur curable terpolymer), and 15 parts of a naphthenic oil (Flexon 580, marketed by Exxon Chemical Co.)

COMPOSITION B

To the base recipe was added 26 parts of an oil-extended EPDM (MD 717, a market development grade Exxon Chemical Co. product, now marketed as Vistalon 3777 having a Mooney viscosity (ML 1+8) of from about 35 to 55 at 260° F., a specific gravity of 0.87, being a sulfur curable terpolymer containing about 75 phr of non-staining paraffinic oil), and 4 additional parts of naphthenic oil (Flexon 580).

COMPOSITION C

To the base recipe was added 27 parts of an oil extended EPDM (containing about 80 phr of non-staining paraffinic oil and having properties similar to the oil extended EPDM of Composition B) and 3 additional parts of naphthenic oil (Flexon 580).

COMPOSITION D

To the base recipe was added 30 parts of an oil extended EPDM (EPcar 5465, marketed by Goodrich Chemical Co. having a Mooney viscosity (ML 1+4) of 50 at 250° F., a specific gravity of 0.90, and being a sulfur curable terpolymer containing 100 phr of non-staining naphthenic oil).

Each of these compositions was then tested for flex fatigue resistance in a test known as the Monsanto fatigue-to-failure test, and the following results were obtained.

| Fatigue to Failure | COMPOSITION USED IN OVERALL FORMULATION | | | |
|---|---|---|---|---|
|  | A | B | C | D |
| Kilocycles at 140% extension | 78 | 144 | 123 | 142 |

These results demonstrate that in compositions having comparable overall viscosities and comparable overall oil contents, significantly improved flexing characteristics are unexpectedly obtained when employing the oil extended EPDM's of the present invention.

EXAMPLE 2

In a second comparative example a butadiene rubber was employed in the various combinations of rubber blends, including that of the present invention. Initially, the following base recipe was prepared:

|  | PARTS |
|---|---|
| Chlorobutyl rubber (Exxon chlorobutyl 1066) | 35 |
| Butadiene rubber (BR 1203) having a Mooney viscosity (ML 1 + 4) of from about 40 to 50 at 212° F., a high % cis content, and a specific gravity of 0.91) | 30 |
| Natural Rubber (#1 RSS) | 20 |
| Carbon Black (N 339) | 20 |
| Carbon Black (N 774) | 20 |
| Stearic Acid | 2 |
| Zinc Oxide | 3 |
| 2,2'-benzothiazyl disulfide | 0.8 |
| Sulphur | 0.3 |
| Alkyl phenoldisulfide (Vultac 5) | 1.25 |

Again in each of these cases Compositions E through H were prepared by combining with this base recipes various compositions of EPDM terpolymers, as follows:

COMPOSITION E

To the base recipe was added 15 parts of a high diene EPDM (Vistalon 6505) and 15 parts of a naphthenic oil (Flexon 641).

COMPOSITION F

To the base recipe was added 26 parts of an oil extended EPDM (MD 717) and 4 parts of a naphthenic oil (Flexon 641).

COMPOSITION G

To the base recipe was added 27 parts of the oil extended EPDM of Composition C and 3 parts of a naphthenic oil (Flexon 641).

COMPOSITION H

To the base recipe was added 30 parts of an oil extended EPDM (EPcar 5465).

The results obtained in connection with the same fatigue to failure test carried out in Example 1 were as follows:

| Fatigue to Failure | COMPOSITION USED IN OVERALL FORMULATION | | | |
|---|---|---|---|---|
| | E | F | G | H |
| Kilocycles at 140% extension | 185 | 322 | 524 | 554 |

It can again be seen that the use of the oil extended EPDM's of the present invention again resulted in significantly improved fatigue to failure values and flexing characteristics, as compared to comparable formulations having similar Mooney viscosities and modulus and comparable overall percentages of oil therein.

What is claimed is:

1. A pneumatic tire side wall composition comprising a blend of from 20 to 70 parts of halobutyl rubber, from 20 to 70 parts of a high unsaturation rubber, and from 10 to 60 parts of an oil extended terpolymer of ethylene, propylene and a diene, said oil extended terpolymer containing between about 25 and 150 phr, based on the weight of the terpolymer prior to oil extension, of an oil selected from the group consisting of naphthenic and paraffinic oils, wherein said terpolymer, prior to being oil extended, has a Mooney viscosity of greater than about 100 at 260° F.

2. The pneumatic tire side wall composition of claim 1 wherein said terpolymer comprises from about 50 to 75% of said ethylene based on the weight of said terpolymer prior to oil extension.

3. The pneumatic tire side wall composition of claim 2 wherein said terpolymer comprises from about 3 to 12% of said diene based on the weight of said terpolymer prior to oil extension.

4. The pneumatic tire side wall composition of claim 1 wherein said halobutyl rubber comprises chlorobutyl rubber.

5. The pneumatic tire side wall composition of claim 1 wherein said oil extended terpolymer includes from about 70 to 110 phr of a naphthenic or paraffinic oil.

6. The pneumatic tire side wall composition of claim 1 wherein said high unsaturation rubber comprises natural rubber.

7. The pneumatic tire side wall composition of claim 1 wherein said high unsaturation rubber comprises styrene butadiene rubber.

8. The pneumatic tire side wall composition of claim 1 wherein said high unsaturation rubber comprises polybutadiene rubber.

9. A method of preparing a pneumatic tire side wall composition which comprises by means well-known in the art preparing an oil extended terpolymer of ethylene, propylene and a diene including between about 25 and 150 phr of an oil selected from the group consisting of paraffinic and naphthenic oils, and blending from about 10 to 60 parts of said oil extended terpolymer with from about 20 to 70 parts of halobutyl rubber and from about 20 to 70 parts of a high unsaturation rubber, wherein said terpolymer, prior to being oil extended has a Mooney viscosity of greater than about 100° at 260° F.

10. The method of claim 9 wherein said terpolymer comprises from about 50 to 75% of said ethylene based on the weight of said terpolymer prior to oil extension.

11. The method of claim 9 wherein said halobutyl rubber comprises chlorobutyl rubber.

12. The method of claim 9 wherein said oil extended terpolymer includes from about 70 to 110 phr of a naphthenic or paraffinic oil.

* * * * *